United States Patent
Lippert et al.

(10) Patent No.: US 11,591,250 B2
(45) Date of Patent: Feb. 28, 2023

(54) FURNACE FOR RELIEVING STRESS FROM GLASS PRODUCTS

(71) Applicant: SCHOTT AG, Mainz (DE)

(72) Inventors: Dominik Lippert, Mitterteich (DE); Wolfgang Kreger, Leonberg (DE); Markus Riedl, Mitterteich (DE); Gottfried Haas, Tirschenreuth (DE)

(73) Assignee: SCHOTT AG, Mainz (DE)

( * ) Notice: Subject to any disclaimer, the term of this patent is extended or adjusted under 35 U.S.C. 154(b) by 531 days.

(21) Appl. No.: 16/719,044

(22) Filed: Dec. 18, 2019

(65) Prior Publication Data

US 2020/0189955 A1    Jun. 18, 2020

(30) Foreign Application Priority Data

Dec. 18, 2018 (DE) .................... 10 2018 222 111.1

(51) Int. Cl.
*G01K 1/00* (2006.01)
*C03B 25/04* (2006.01)
*G01K 1/18* (2006.01)
*G01K 1/08* (2021.01)

(52) U.S. Cl.
CPC ............. *C03B 25/04* (2013.01); *G01K 1/08* (2013.01); *G01K 1/18* (2013.01)

(58) Field of Classification Search
CPC combination set(s) only.
See application file for complete search history.

(56) References Cited

U.S. PATENT DOCUMENTS

| | | | |
|---|---|---|---|
| 4,114,444 A | 9/1978 | Schwenninger | |
| 4,519,830 A | 5/1985 | Wolak | |
| 4,553,530 A | 11/1985 | Mizukami | |
| 4,558,959 A * | 12/1985 | Thomas | G01K 13/06 374/165 |
| 4,717,787 A | 1/1988 | Freppon | |
| 5,137,582 A | 8/1992 | Kasman | |
| 6,712,507 B2 * | 3/2004 | Park | G01K 1/16 374/185 |
| 6,772,610 B1 | 8/2004 | Albrand | |
| 7,121,098 B2 * | 10/2006 | Hatcher | F25B 9/04 606/15 |
| 8,101,019 B2 * | 1/2012 | Sahr | C30B 29/06 117/37 |
| 8,549,886 B2 * | 10/2013 | Takahashi | C03B 37/0146 65/509 |
| 9,212,955 B2 * | 12/2015 | Clothier | G01K 15/005 |
| 2003/0231698 A1 | 12/2003 | Yamaguchi | |
| 2006/0096975 A1 | 5/2006 | Haller | |

(Continued)

FOREIGN PATENT DOCUMENTS

| CA | 1212235 | 10/1986 |
|---|---|---|
| CN | 1771204 | 5/2006 |

(Continued)

*Primary Examiner* — Lisa M Caputo
*Assistant Examiner* — Nasir U. Ahmed
(74) *Attorney, Agent, or Firm* — Ruggiero McAllister & McMahon LLC

(57) ABSTRACT

A furnace for relieving glass products of stress is provided. The furnace has a furnace interior and a thermal element that measures temperatures in the furnace interior. The thermal element is enclosed by an enveloping tube composed of an inorganic material.

19 Claims, 3 Drawing Sheets

(56) References Cited

U.S. PATENT DOCUMENTS

| | | |
|---|---|---|
| 2012/0230365 A1 | 9/2012 | Clothier |
| 2013/0017504 A1 | 1/2013 | Yoo |
| 2019/0101453 A1* | 4/2019 | Foreman, Jr. ............ G01K 1/14 |

FOREIGN PATENT DOCUMENTS

| | | | | |
|---|---|---|---|---|
| CN | 103718010 | | 4/2014 | |
| CN | 104359935 | | 2/2015 | |
| CN | 106116127 | | 11/2016 | |
| CN | 205898720 U | * | 1/2017 | ............ F23M 11/04 |
| CN | 206974559 | | 2/2018 | |
| DE | 3528161 | | 10/1986 | |
| GB | 1097695 | | 1/1968 | |
| JP | S5819546 | | 2/1983 | |
| JP | 2003033888 | | 2/2003 | |
| JP | 2007271199 | | 10/2007 | |
| JP | 2009234873 | | 10/2009 | |

\* cited by examiner

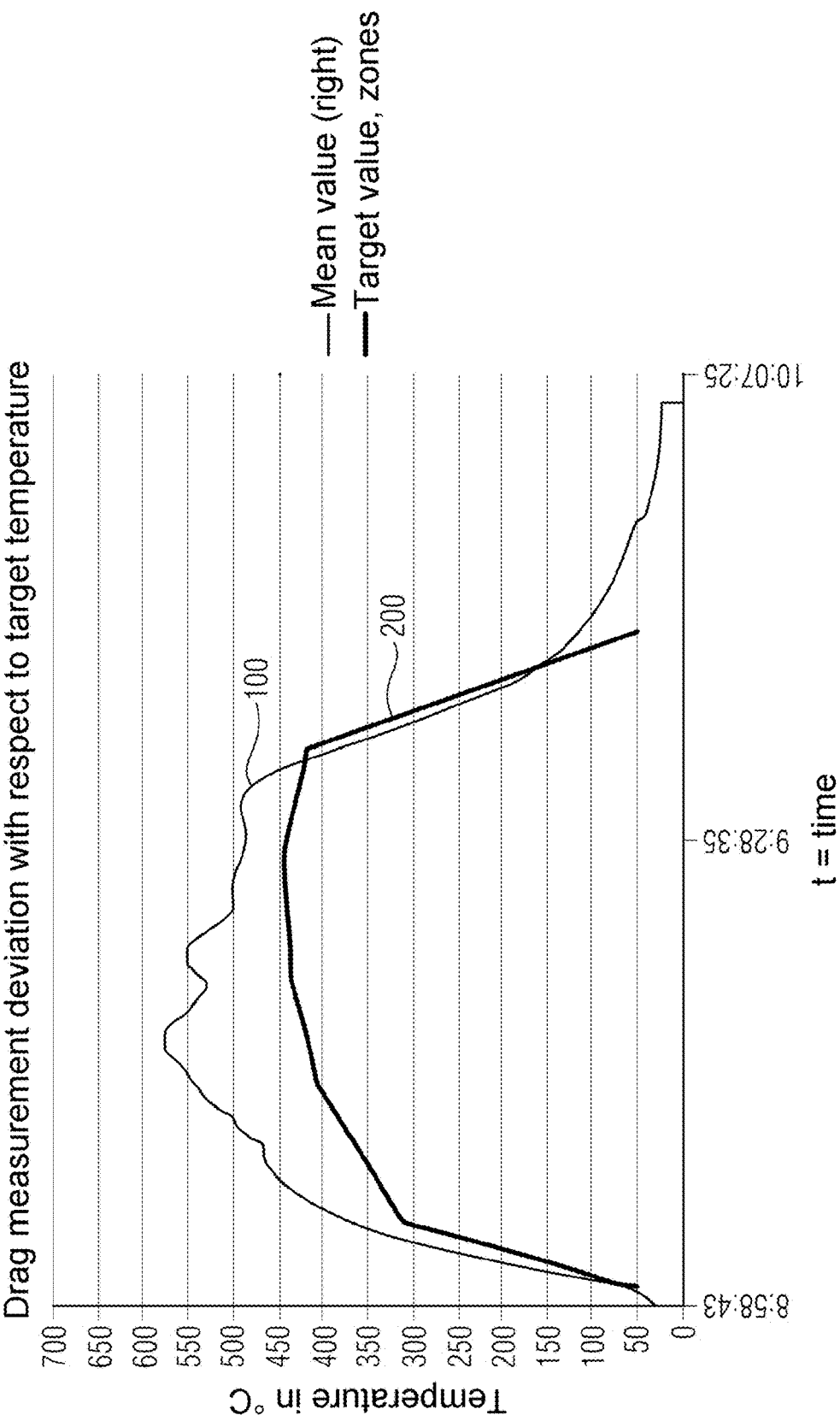

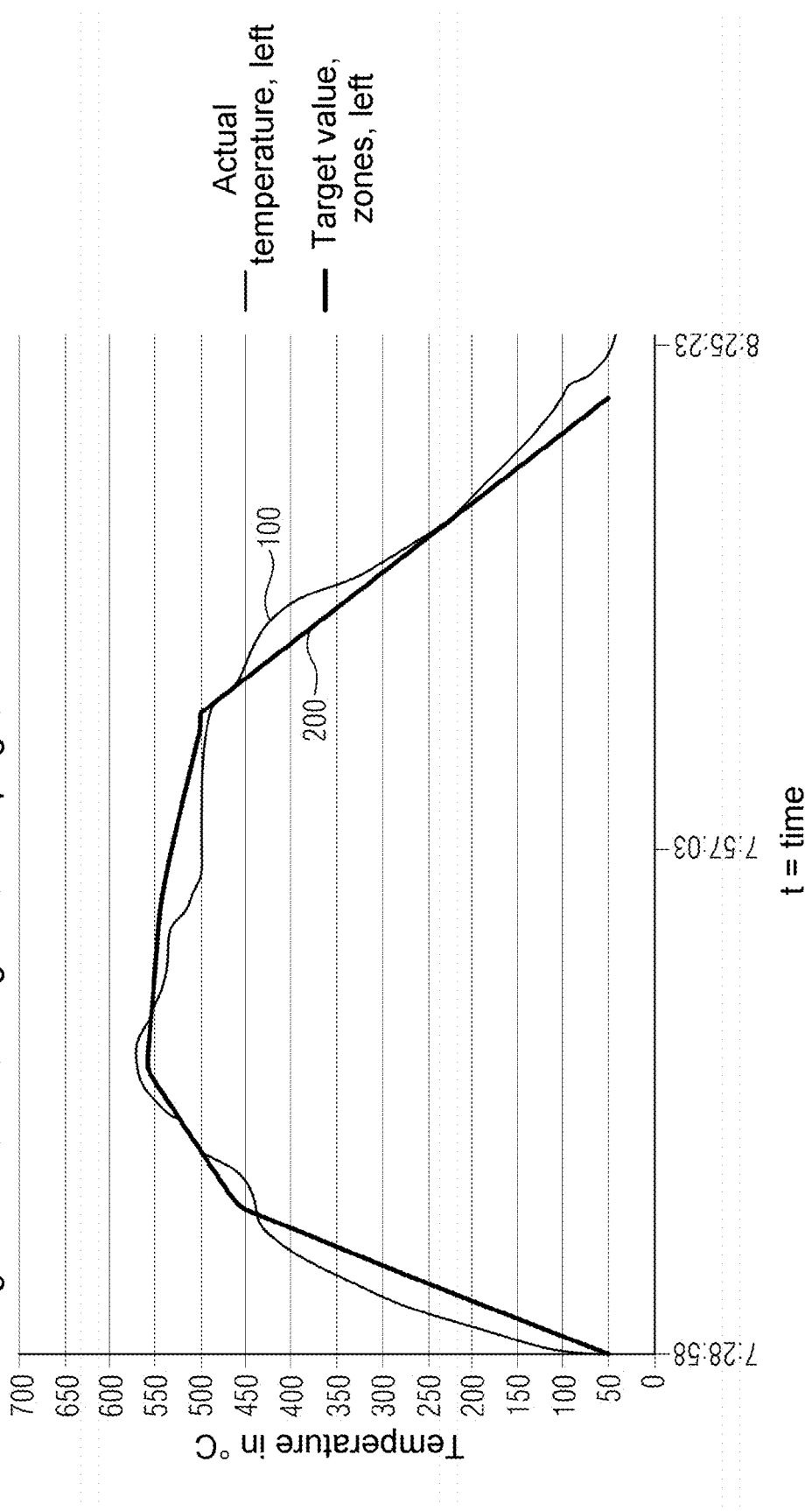

FURNACE FOR RELIEVING STRESS FROM GLASS PRODUCTS

CROSS REFERENCE TO RELATED APPLICATIONS

This application claims benefit under 35 USC § 119 of German Application 10 2018 222 111.1 filed Dec. 18, 2018, the entire contents of which are incorporated herein by reference.

BACKGROUND

1. Field of the Invention

The invention relates to a furnace, in particular a cooling furnace for relieving glass products of stress, having a measurement device. The measurement device is in particular a thermal element. The invention also relates to a method for measuring a temperature profile of a furnace.

2. Description of Related Art

In order to relieve glass products, for example glass tubes, of stress after the production thereof, provision may be made for the glass products to be guided through a cooling furnace. For cooling the glass product in a furnace, it is essential that the temperature can be set exactly. In order to achieve this, it is necessary to determine the temperature in the furnace. According to the prior art, use has often been made here of regulating thermal elements, preferably with thermal elements.

Thermal elements are described in a large number of publications, for example in GB 1,097,695 A, which presents a thermal element with a glass. Also, U.S. Pat. No. 5,137,582 A presents a thermal element with a housing composed of glass, for example borosilicate glass, or porcelain. From DE 3528161 A, a thermal element composed of a thermocouple with a protective tube for measuring temperatures in the range from 300° C. to 1300° C. was made known.

During measurements carried out in cooling devices according to the prior art, in which, as measurement sensors, use was made of thermal elements such as described for example in the aforementioned applications, considerable deviations of the actual temperature from the target temperature were established.

In this regard, during tests in which a temperature measurement sensor, in particular a thermal element, was connected directly to the glass product, in particular glass tube, to be treated and the temperature measurement sensor was simultaneously guided with the glass product through the furnace for the purpose of cooling, it was established that the actual temperature measured at the glass product, that is to say at the glass tube to be cooled, deviates from the target temperature set at the furnace by almost 100 K.

SUMMARY

It is therefore an object of the invention to overcome the disadvantages of the prior art and, in particular, to allow reliable determination of the temperature in the furnace interior that acts on the glass product to be cooled.

The furnace, in particular cooling furnace for relieving glass products of stress, according to the invention has a measurement device, in particular a thermal element, for measuring temperatures. The glass product to be cooled is preferably a glass tube.

According to the invention, it is provided that the measurement device, in particular the thermal element, is enclosed, preferably completely enclosed, by an enveloping tube, preferably composed of an inorganic material, in particular a glass material. Such a configuration leads to a difference between the target temperature set in the furnace and the actual temperature measured at the glass product, in particular glass tube, being treated practically no longer occurring. Consequently, with such a construction, reliable determination of the target and actual temperatures is possible, as emerges in particular from the description of the figures below.

It is particularly preferable if the absorption coefficients of the glass product, in particular the glass tube to be cooled, and the measurement device, in particular the enveloping tube surrounding the thermal element, substantially agree. In case of agreement, the difference between target temperature and actual temperature becomes particularly small.

The thermal element is particularly preferably formed as a sheathed thermal element, in which a thermal element wire is situated in a metal tube so as to be insulated and forms the thermocouple. Use may be made of high-grade steels as sheath materials.

It is preferable if the enveloping tube is pushed onto the thermal element with the smallest possible gap. The small spacing gives rise to a stable situation between heat conduction, radiation and convection.

In one refined embodiment of the invention, the enveloping tube projects beyond the thermal element, specifically by more than 1 cm, preferably by more than 5 cm. This makes it possible for the enveloping tube to be able to be of open form and for a measurement error to be minimized. An open tube avoids complicated closure of the tube end, which significantly facilitates the production of the enveloping tube. The temperature deviations are consequently sufficiently minimized. However, the invention would also function with a tube end which is sealed by melting/closed, and so the open tube end is advantageous but not required.

In a further configuration of the invention, the thermal element projects through furnace insulation into the furnace and thus permits determination of temperature in the furnace interior.

In addition to the furnace, the invention also specifies a method for measuring a temperature profile of a furnace, wherein, according to the invention, the temperature of a glass product, in particular a glass tube, is measured with the aid of a thermal element.

DESCRIPTION OF THE DRAWINGS

The invention will be described by way of example below on the basis of the figures, in which:

FIG. 3 shows a diagram of the temperature deviation of the target temperature from the actual temperature during drag measurements with a thermal element without enveloping tube; and FIG. 4 shows a diagram of the temperature deviation of the target temperature from the actual temperature during drag measurements with a thermal element with enveloping tube.

DETAILED DESCRIPTION

Figure 1:
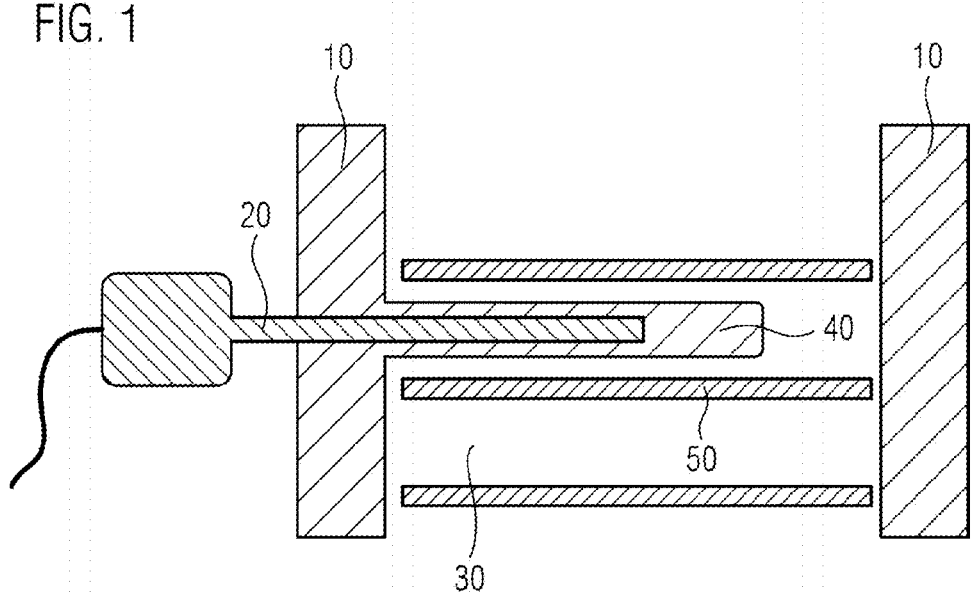
FIG. 1 shows a side view of a furnace space with glass products and a glass enveloping tube over the thermal element.

FIG. 1 shows a part of a furnace 1 according to the invention, having a thermal element which is guided into the furnace interior and is surrounded by an enveloping tube. The furnace 1 is lined with furnace insulation 10 and is not illustrated in its entirety in FIG. 1. A thermal element 20 is guided through the furnace insulation 10 and projects into the furnace interior 30. A multiplicity of glass products 50 to be treated are situated in the interior 30 of the furnace. FIG. 1 shows in total three glass products, glass tubes in the present case, to be treated.

According to the invention, the thermal element 20 is surrounded by an enveloping tube 40, wherein the absorption coefficient of the enveloping tube substantially corresponds to that of the glass to be tested. By virtue of the fact that the absorption coefficient of the enveloping tube 40 substantially corresponds to the absorption coefficient of the glass to be tested, it is achieved that no temperature differences occur between the glass tube to be tested and the temperature measured with the aid of the thermal element 20 in the furnace space. In the present application, a "substantially identical absorption coefficient" is to be understood as meaning that the difference in the absorption coefficient between the glass product and the enveloping glass of the thermal element is at most 20%, preferably at most 10%, in particular at most 5%.

The adaptation of the absorption coefficient of both the enveloping tube of the thermal element and the glass product, in particular glass tube, to be cooled makes it possible for the temperature difference, which is measured directly at the product, for example by an additional measurement probe or thermal element, and is indicated by the thermal element, to be minimized, with the result that the temperature measured by the thermal element with enveloping tube, inserted into the furnace, is an indicator for the temperature prevailing at the product itself, with additional thermal elements not being necessary. The additional thermal element may be directly fastened to the product, with the result that a complete temperature profile can be recorded for a passage through the furnace by way of a drag measurement.

The enveloping tube 40 is open on both sides in the illustrated embodiment, without restriction thereto.

In one particular configuration of the invention, the glass product to be treated in accordance with a temperature curve consists of borosilicate glass or aluminosilicate glass. The enveloping glass, which is placed around the thermal element, consists likewise of borosilicate glass or aluminosilicate glass, or quartz glass. The choice of quartz glasses for the enveloping tube has the advantage that very high melting and softening temperatures are achieved, and the glasses are therefore particularly suitable for use at high temperatures since they remain dimensionally stable for a long time.

In the present exemplary embodiment, the enveloping tube projects beyond the thermal element by a length L. The projection L of the enveloping tube beyond the thermal element preferably amounts to more than 1 cm, in particular amounts to more than 5 cm. The glass products 50 to be treated are guided through the furnace space. The furnace 1 is consequently a continuous furnace.

Figure 2:
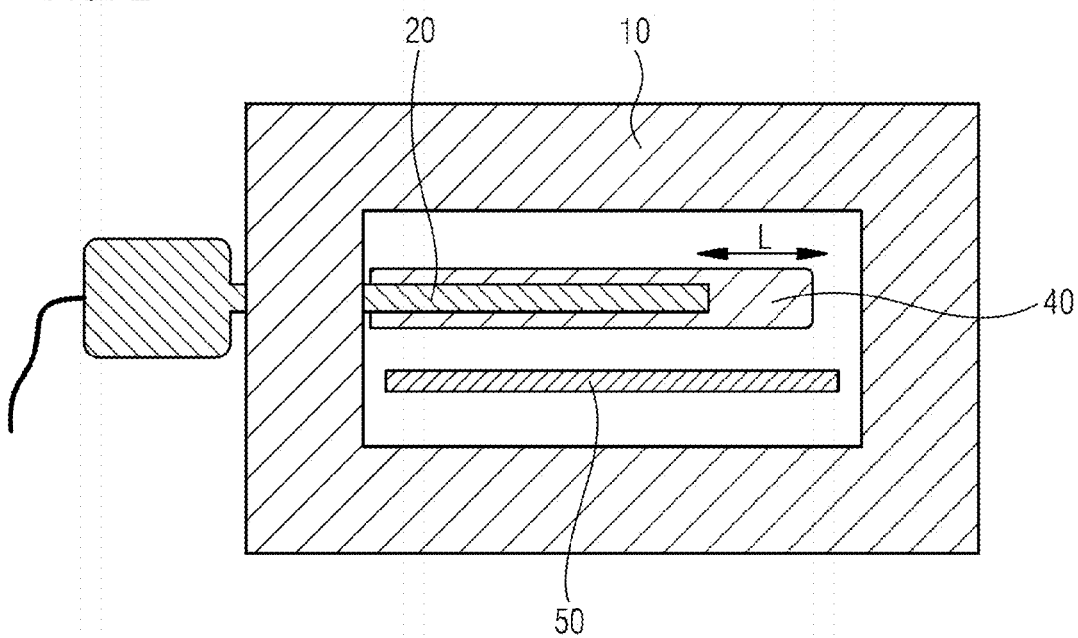
FIG. 2 shows a plan view of the furnace space with an arrangement of the thermal elements, including enveloping tube, and glass products.

FIG. 2 shows a plan view of a furnace 1 according to the invention. Components identical to those in FIG. 1 are provided with the same reference numerals. In FIG. 2, the projection L of the enveloping tube 40 beyond the thermal element 20 can clearly be seen. The glass product 50 to be treated, in the form of a glass tube, can also clearly be seen in FIG. 2. The entire furnace insulation 10 is likewise illustrated. The furnace 1 is a continuous furnace, through which the product to be treated is guided. The thermal element 20 is arranged in a stationary manner in the furnace.

FIG. 3 shows the deviation of the target temperature 200 from the actual temperature 100, which occurs during a drag measurement. Drag measurements refer to measurements in which, in addition to the thermal elements of the furnace, temperature sensors directly wired to the glass product are fitted and are "dragged" through the furnace. The drag measurement illustrated in FIG. 3 clearly shows a deviation of the target temperature from the actual temperature. The target temperature is indicated by the reference numeral 200, and the actual temperature is indicated by 100.

The y-axis of the diagram in FIG. 3 indicates the temperature and the x-axis thereof indicates the time over which the product to be heated is dragged through the furnace. Therefore, the x-axis constitutes a measure for the time in the furnace, at which the object to be heated is situated, and therefore constitutes a measure for the spatial temperature profile in the furnace.

What is sought is the most uniform possible profile over the furnace space, in which the target temperature corresponds to the actual temperature. As can be seen from FIG. 3, considerable deviations of the target temperature from the actual temperature occur for the case in which the thermal element is not surrounded by an enveloping tube. In this regard, in the case of the thermal element not being surrounded by an enveloping tube, the deviation of the target temperature from the actual temperature amounts to up to 200 K, as FIG. 3 shows.

In the application, "temperature deviation" is to be understood as meaning the deviation of the actual temperature at the glass product (glass tube) to be treated from the target temperature measured in the furnace. If, as illustrated in FIG. 3, the deviation of the target temperature from the actual temperature amounts to more than 150 K, then this means that, for example, the temperature at the glass product is 550 K, but only a temperature of 400 K is determined in the furnace interior with the aid of the thermal element without enveloping tube.

FIG. 4 shows the result of a drag measurement with a thermal element according to the invention with an enveloping tube. Here too, "drag measurement" is to be understood as meaning that the glass product to be treated is provided with an additional thermal element, thus resulting in the determination of the temperature in addition to the furnace temperature. In the case of the thermal element being surrounded by an enveloping tube, the small deviation between the target temperature 200 and the actual temperature 100 can clearly be seen, that is to say the temperature measured in the furnace interior substantially agrees with the temperature of the glass product, the glass tubes in this case, determined by the additional thermal element.

The invention for the first time specifies a measurement device which makes possible exact determination of temperature in a furnace and which avoids temperature differences between temperatures occurring at the glass product to be cooled and temperatures measured with the aid of the thermal element. Consequently, an in-situ regulation of the furnace for the exact temperature control of the glass product is possible. The invention thus allows the stresses in the glass product that are present prior to the thermal process to be reduced towards zero. It is likewise possible for other temperature-dependent processes, such as for example baking of coatings, to be controlled in an exact manner.

What is claimed is:

1. A furnace for relieving a glass product of stress, comprising:
   a furnace interior configured to receive the glass product;
   a thermal element configured to measure temperatures in the furnace interior; and
   an enveloping tube comprising glass that encloses the thermal element, the enveloping tube being positioned in the furnace interior to be spaced from the glass product that is received in the furnace interior, and the enveloping tube being configured to have an IR absorption coefficient with a difference to an IR absorption coefficient of the glass product by at most 20%.

2. The furnace of claim 1, wherein the enveloping tube is open on both ends.

3. The furnace of claim 1, wherein the difference is at most 10%.

4. The furnace of claim 1, wherein the thermal element comprises a thermal element wire.

5. The furnace of claim 4, wherein the thermal element further comprises a metal tube that sheaths the thermal element wire.

6. The furnace of claim 1, wherein the furnace interior is configured to receive the glass product in a form of a glass tube.

7. The furnace of claim 6, wherein the glass of the enveloping tube is an aluminosilicate glass or a quartz glass.

8. The furnace of claim 1, further comprising a spacing between inner walls of the enveloping tube and the thermal element in a range 0.5 mm to 5 mm.

9. The furnace of claim 1, wherein the enveloping tube projects beyond an end of the thermal by more than 1 cm or by more than 5 cm.

10. The furnace of claim 1, further comprising furnace insulation through which the thermal element extends into the furnace interior.

11. A furnace for relieving a glass product of stress, comprising:
    a furnace insulation defining a furnace interior, the furnace interior being configured to receive the glass product continuously guided therethrough;
    a thermal element extending through the furnace wall into the furnace interior, the thermal element being configured to measure temperatures in the furnace interior; and
    a glass tube having a first open end at the furnace insulation and a second open end in the furnace interior, the thermal element extends into the glass tube, the glass tube being positioned in the furnace interior to be spaced from the glass product that is received in the furnace interior, and the glass tube being configured to have an IR absorption coefficient with a difference to an IR absorption coefficient of the glass product by at most 20%.

12. The furnace of claim 11, wherein the second open end projects beyond the thermal element.

13. The furnace of claim 12, wherein the first open end is spaced from the furnace insulation.

14. The furnace of claim 12, further comprising a spacing between inner walls of the glass tube and the thermal element in a range 0.5 mm to 5 mm.

15. The furnace of claim 11, wherein the first open end is spaced from the furnace insulation.

16. The furnace of claim 11, wherein the glass tube has an absorption coefficient for IR radiation in the wavelength range of 0.7 μm to 80 μm.

17. A method for measuring a temperature profile of a furnace for glass products, comprising:
    selecting a glass tube that has an absorption coefficient for IR radiation that differs from an absorption coefficient for IR radiation of the glass product by at most 20%, wherein the glass tube has a first open end and a second open end;
    arranging a thermal element through an insulation of the furnace into a furnace interior;
    placing the glass tube over the thermal element in the furnace interior so that the first open end is proximate the insulation and the second open end projects beyond the thermal element;
    guiding the glass product through the furnace interior resulting in a temperature profile of the furnace; and
    measuring the temperature profile using the thermal element.

18. The method of claim 17, wherein the step of placing further comprises placing so that the first open is spaced from the furnace insulation.

19. The method of claim 17, wherein the step of placing further comprises placing so that inner walls of the glass tube are spaced from the thermal element in a range 0.5 mm to 5 mm.

* * * * *